Figure 1:
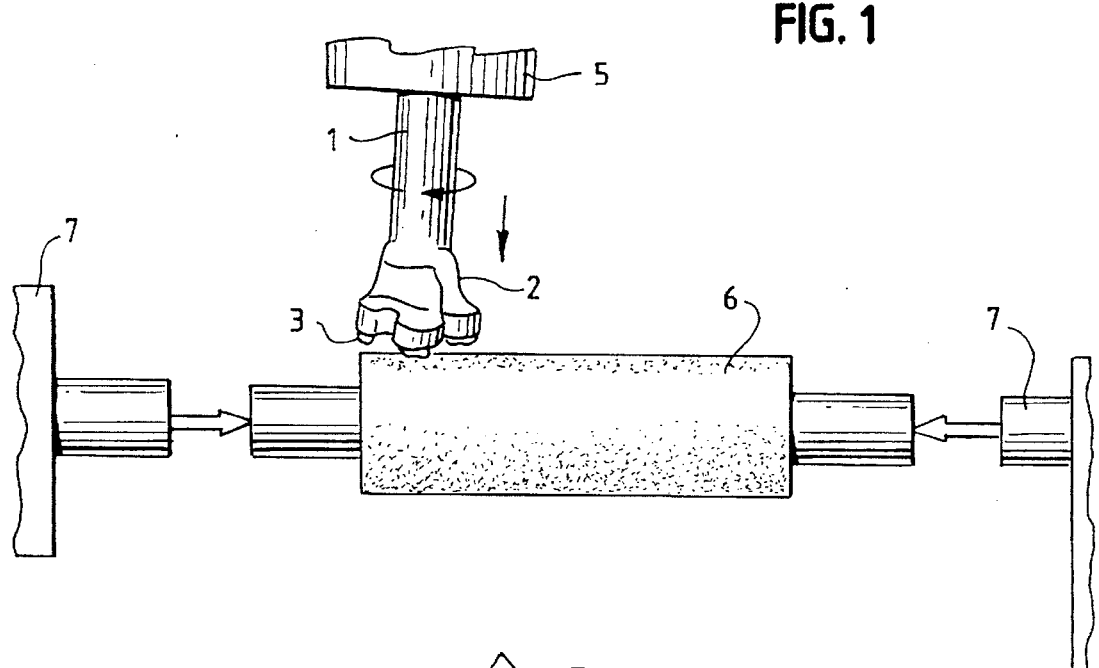

United States Patent [19]
Scholz et al.

[11] Patent Number: 5,660,092
[45] Date of Patent: Aug. 26, 1997

[54] PROCESS FOR MACHINING THE SURFACE OF ELASTOMERS BY TURNING AND ETCHING WITH HIGH SPEED CUTTER HEAD

[75] Inventors: Günter Scholz, Bergisch-Gladbach; Willi Stammel, Kerpen, both of Germany

[73] Assignee: Felix Bottcher GmbH & Co., Cologne, Germany

[21] Appl. No.: 440,071

[22] Filed: May 12, 1995

[51] Int. Cl.⁶ .................. B23B 1/00; B23C 3/04; B24B 5/36
[52] U.S. Cl. .................. 82/1.11; 29/895.1; 29/33.52; 409/132; 492/56
[58] Field of Search .................. 82/1.11, 131; 29/27 C, 29/28, 33.52, 895.1; 409/132; 492/56; 451/218

[56] References Cited

U.S. PATENT DOCUMENTS

| | | | |
|---|---|---|---|
| 2,294,872 | 9/1942 | Wood | 451/218 |
| 3,799,822 | 3/1974 | Lewicki, Jr. et al. | 492/56 |

FOREIGN PATENT DOCUMENTS

| | | | |
|---|---|---|---|
| 484112 | 12/1974 | Australia. | |
| 0050173 | 4/1992 | European Pat. Off.. | |
| 0625406A1 | 11/1994 | European Pat. Off.. | |
| 1190633 | 4/1965 | Germany. | |
| 2504012 | 10/1975 | Germany. | |
| 2709360 | 9/1978 | Germany. | |
| 2736612 | 2/1979 | Germany. | |
| 4305716 | 9/1994 | Germany. | |
| 52-51191 | 4/1977 | Japan. | |
| 267101 | 11/1988 | Japan | 82/1.11 |
| 1748956 | 7/1992 | U.S.S.R. | 82/1.11 |
| 703849 | 2/1954 | United Kingdom. | |

*Primary Examiner*—M. Rachuba
*Assistant Examiner*—Kenneth J. Hansen
*Attorney, Agent, or Firm*—McDonnell Boehnen Hulbert & Berghoff

[57] ABSTRACT

A process for the surface treatment of elastomers forming the outermost layer of a coated rotationally symmetrical body, the outer layer having a hardness of from 10 Shore A to 100 Shore D, wherein a high cycle motor spindle bearing a high-speed cutter head with cutting tips is brought into contact with the work material.

6 Claims, 1 Drawing Sheet

PROCESS FOR MACHINING THE SURFACE OF ELASTOMERS BY TURNING AND ETCHING WITH HIGH SPEED CUTTER HEAD

BACKGROUND OF THE INVENTION

1. Field of the Invention

The invention relates to a process for the treatment of the elastomeric surface of a rotationally symmetrical body. Typical bodies that can be treated using the present invention are rollers and printing cylinders.

2. Description of the Art

According to prior art, conventional methods of production engineering, surface treatment techniques such as grinding, turning on a lathe, grinding on an abrasion belt and milling are used in the mechanical processing of metals and plastics. In addition to the above-mentioned methods, the use of a "rubber hog" and skiving are known for the mechanical processing of elastomers.

In addition to the known methods of production engineering and surface treatment, the use of so-called high cycle motor spindles has been adopted in metal and plastics machining. Such high cycle motor spindles are constructed to be able to reach speeds of up to 120,000 rpm. Known high-speed cutter heads are used in conjunction with the high cycle motor spindles.

German Offenlegungsschrift DE-OS 25 04 012 describes a cutter, more specifically a rabbeting cutter (notching cutter) or a keyway cutter (grooving cutter) comprising a reversing cutter. This cutter is used for machining wood or plastics.

German Auslegeschrift DE-AS 11 90 633 describes a cutter head for machining wood or plastics on which safety elements have been provided to prevent the cutters on the cutter head from being flung off due to the increased centrifugal force upon rotation of the head. It is mentioned that such tools rotate at speeds of from 600 to 12,000 rpm.

German Offenlegungsschrift DE-OS 27 36 612 describes a reversible cutter head with indexable inserts comprising circumferential chucking grooves. According to pages 4–5, such cutter heads or cutter block spindles are preferably used in machining wood or plastics.

German Offenlegungsschrift DE-OS 27 09 360 reports on a device for planing and comminuting woods, plastics and other materials in which jointer irons (plane irons) or rack cutters (comb cutters) can be inserted into a knife holder. The cutters have longitudinal edges formed as cutting edges and the cross-sectional shape of a parallelogram.

In the past, high cycle motor spindles bearing high-speed cutter heads were used only with very hard work materials in the mechanical processing of metal and plastics. With softer materials, high cycle motor spindles bearing high-speed cutter heads so far have not been used, since it was believed that this kind of mechanical processing would not result in the required surface quality. This is fully applicable to the mechanical processing of coatings of rotationally symmetrical bodies.

The techniques used in the prior art suffer from the disadvantage that a high amount of heat is generated during processing of materials. Furthermore, the so-called "trumpet effect" may occur, which is an irregularity in the symmetry in the end of the surfaces to be treated. Furthermore, vibration tracks (so-called chatter marks) may be encountered.

The established procedures also do not allow for the controlled removal of chips formed during the surface treatment, since the removed chip material will get in between the grinding wheel and the workpiece. This in return can result in abrasion commas being formed on the surface being treated.

Therefore, there is a need for a process for the mechanical surface treatment of elastomers forming the outermost layer of a rotationally symmetrical body, the surface having a hardness of from 10 Shore A to 100 Shore D, which process eliminates the above-mentioned drawbacks.

DESCRIPTION OF THE INVENTION AND PREFERRED EMBODIMENTS

It is an object of the present invention to provide a process for the surface treatment of elastomers forming the outermost layer of a coated rotationally symmetrical body, the outer layer having a hardness of from 10 Shore A to 100 Shore D. In the process of the present invention, a high cycle motor spindle bearing a high-speed cutter head is brought into contact with the elastomeric surface of the work material while the work material is rotated around an axis of rotational symmetry. The high-speed cutter heads include cutting tips that actually contact the surface of the work material and thereby cut and remove a portion of the elastomeric surface. The cutting tips may be made from materials capable of cutting the elastomeric surface of interest, including special steels with hardened surfaces or carbide.

In general, the cutter head may be rotated at speeds of from about 500 to 120,000 rpm, and preferably from about 5,000 to 120,000 rpm. The elastomers intended to be subjected to the cutting surface treatment mostly are in the form of the outermost layer on coated rotationally symmetrical bodies.

The treatment according to the present invention of the rotationally symmetrical bodies is effected by using an axially or radially mounted high cycle motor spindle bearing a high-speed cutter head on the support portion of a machine tool. The actuation of the material or workpiece and of the support (rotation, feed, adjustment) are effected by means of a machine tool. The actuation of the cutting chip removal may be effected through the high cycle motor spindle bearing the fast rotating high-speed cutter head.

In contrast to the prior art belief, it has been observed in the process according to the invention that the elastomer surface coating comprising cross-linked polymers behaves like a solid upon an increase in the rotational speed of the cutter head. Thus, in the course of the procedure there is neither any crushing nor any yielding of the relatively soft elastomer. By means of the process according to the invention it is possible to impart a well-defined and reproducible geometry and/or surface roughness to the treated elastomeric surface.

Another advantage in the practice of the present invention is the generation of very low chip sizes. By contrast, the larger chips formed in conventional processes may result in the formation of abrasion commas, since the removed material may be pulled in between the grinding wheels and workpieces.

In the process according to the invention, the chips formed are powdery. Thus, there are hardly any cutting forces. Also, the present invention exhibits very low generation of heat, thermal expansion not being detectable in comparison to known techniques of chip removal.

Another advantage of the process according to the present invention is constituted by central chip removal using suction. In the conventional machining procedures on surfaces, the removed material as formed will get in between the grinding wheel and the work material or workpiece, and hence, lead to complications such as the formation of abrasion commas on the surface being treated. In the process according to the invention, the high number of revolutions of the high-speed cutter head causes a high volume air stream to be generated that propels the chips along over the cutter head and centrally conveys them to a chip removal suction device. The latter suction device consists of the spiral housing and the rotor that have been mounted on the tool on the high-cycle motor spindle. Thus, any adverse effect on the treatment by the chips being formed is prevented by this controlled chip removal.

The quality of the surface thus produced is significantly improved over that resulting from the previous treatment techniques of surfaces of elastomers having a hardness of from 10 Shore A to 100 Shore D. The required surface structure may be controlled via the parameter form of the cutting tool (clearance angle, wedge angle, rake angle), the rotational speed of the tool spindle, the rotational speed of the workpiece spindle, the feed velocity and the number of the reversible carbide tips (cutters) on the cutter head.

On the surfaces thus produced, the drawbacks inherent in the prior art are not encountered. Heat generation during the surface treatment according to the invention is very low. An improved geometry and an improved dimensional stability of the surface are obtained. The trumpet effect is avoided. Both feed marks in the radial direction (direction of pressure) and vibration tracks (chatter marks) are not encountered. Also, cracks are not formed in the course of the treatment. By means of the process, all common mechanical surface treatment operations can be carried out, such as grooving, drilling, contouring of any kind, treatment of end faces and circumferential surfaces.

Furthermore, the process has the advantage that the period of time required for treatment and changeover can be considerably reduced. Thus, working steps may be combined on one machine. These same steps, according to the prior art, would have to be carried out on different units and machines.

Because of the centrally controlled chip removal, no surface cleaning is necessary after the surface treatment. Procedures such as longitudinal cutting, planar cutting, roughing, rough grinding, finish grinding, polishing and machine changeover in longitudinal treatment, pretreatment and final treatment can be combined as working steps on one machine. Due to the combination of work steps and the increased cutting performance of the high-cycle cutting heads, the periods of time needed for a surface treatment can be significantly reduced.

The process according to the invention can be adopted upon a simple changeover on all machine tools already available on the premises. Also, an exhauster unit already available may be continued to be utilized, since the central dust removal by suction can be connected thereto.

In the process there are generated recyclable waste materials in powder form having approximately the same particle sizes. These powders formed by the removal of the cutting chips do not have to be cooled with liquid media and cannot undergo self-ignition. These materials are removed from the workpiece by means of the above-described suction device. Any evolution of smoke and formation of dust is thereby avoided without the need for further expensive protection against self-ignition or ignition. This results in substantial advantages with respect to the reusability of the waste powder generated by the process, since no change of the material will be caused due to a generation of heat or by contact with a coolant.

Rollers that are surface treated by means of the process according to the present invention provide a consistent metered media delivery, substantially due to the improved geometry and surface structure. These properties are especially advantageous for use as, for example, printing cylinders.

The process according to the invention may further comprise an integrated component in a working center including the further functions of an automatic change of tools, automatic change of workpieces, computerized numerical control, and interface for operational data acquisition.

BRIEF DESCRIPTIONS OF THE DRAWINGS

Figure 2:
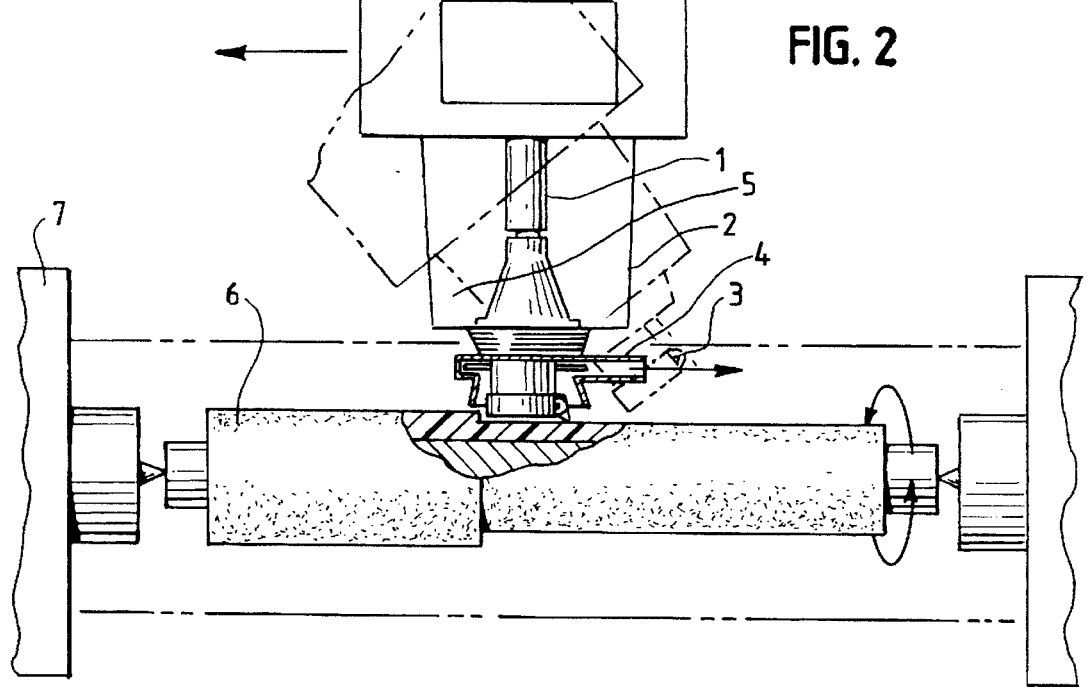

FIGS. 1 and 2 are schematic side views of a preferred embodiment of an apparatus capable of carrying out a preferred embodiment of the inventive process.

Referring to FIGS. 1 and 2, a symmetrically rotatable body 6 is shown. This rotationally symmetrical body is coated with an elastomeric coating having a surface hardness between about 10 Shore A to about 100 Shore D. The body 6 is mounted on a machine tool 7 such that it can be rotated about an axis of rotational symmetry, here its longitudinal axis. In addition, mounting on the machine tool 7 permits the body 6 to have its horizontal feed rate adjusted, i.e., the feed rate along its rotational axis. Its speed of rotation can also be adjusted.

The surface of the rotationally symmetrical body is etched by bringing the surface into cutting contact with a rotating cutter head 2. The cutter head is mounted on a high frequency motor spindle 1 that causes the cutter head to rotate at speeds between about 500 rpm and about 120,000 rpm. The cutter head has disposed on its working surface, a plurality of cutters or cutting tips 3. These cutters actually contact the elastomeric surface and etch that surface by removing powdery chips of elastomer.

The motor spindle 1, cutter head 2 and cutter tips 3 are all supported on support arm 5. In addition, a suction chip removal device 4 is provided to remove the powdery chips as they are formed, thereby preventing them from interfering with the etching of the elastomeric surface.

In this preferred embodiment, the rotationally symmetrical body 6 is mounted on the machine tool 7 and rotated about its rotational axis. The cutting tips 3 of the cutter head 2 are brought into cutting contact with the elastomeric surface. The cutting tips 3 on the cutter head 2 are rotated about the longitudinal axis of the motor spindle on which they are mounted at predetermined speed(s). The contact between the cutting tips 3 and the elastomeric surface causes predetermined and reproducible etching of the elastomeric surface, thereby resulting in the creation of powdery chips. These powdery chips are removed from the work area by means of the centrally located suction device 4.

By means of the inventive process, a variety of reproducible designs and geometries may be etched on the surface of elastomeric coatings on symmetrically rotatable bodies. Using the inventive process, the prior drawbacks of the known methods of the treating the surface of such bodies are largely avoided.

The above description is illustrative of the present invention. However, many additional embodiments not specifically disclosed herein may nonetheless fall within the spirit and/or scope of the present invention as claimed and its equivalents.

We claim:

1. A process for treating the surface of a rotationally symmetrical body, the surface to be treated comprising an elastomeric coating on the body, the coating having a hardness of from about 10 Shore A to about 100 Shore D, comprising the following steps:

rotating the body around an axis of rotational symmetry, contacting the surface of the body with a high-speed cutter head mounted on a high cycle motor spindle, the high-speed cutter head having cutting tips, the cutting tips being made of hardened metal, and rotating the cutter head such that the surface is etched by the removal of chips of elastomer due to the contact between the tips and the surface.

2. The process according to claim 1, wherein the cutter head is rotated around its longitudinal axis at a speed between about 500 rpm and about 120,000 rpm.

3. The process according to claim 1, wherein the body is rotated on a machine tool such that the axial feed rate and the rotational speed of the body can be adjusted.

4. The process according to claim 3, wherein the feed rate, the rotational speed of the body and the rotational speed of the cutter head are controlled independently.

5. The process according to claim 1, wherein the etching of the surface of the body creates a defined and reproducible configuration on the surface of the body.

6. The process according to claim 1, wherein the chips are removed by suction.

* * * * *